US010852020B2

(12) United States Patent
LeRoy et al.

(10) Patent No.: US 10,852,020 B2
(45) Date of Patent: *Dec. 1, 2020

(54) TIME-CONSTRAINED CONTROL OF AN HVAC SYSTEM

(71) Applicant: Trane International Inc., Davidson, NC (US)

(72) Inventors: Jason Thomas LeRoy, Tyler, TX (US); Kirby N. Bicknell, Tyler, TX (US); Christopher Blake Smith, Whitehouse, TX (US); John Hughes, Flint, TX (US); Gregory S. Brown, Flint, TX (US)

(73) Assignee: Trane International Inc., Davidson, NC (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/269,875

(22) Filed: Feb. 7, 2019

(65) Prior Publication Data
US 2019/0170380 A1 Jun. 6, 2019

Related U.S. Application Data

(63) Continuation of application No. 15/499,833, filed on Apr. 27, 2017, now Pat. No. 10,203,127.
(Continued)

(51) Int. Cl.
*F24F 11/30* (2018.01)
*F24F 13/24* (2006.01)
(Continued)

(52) U.S. Cl.
CPC .............. *F24F 11/30* (2018.01); *F24F 11/52* (2018.01); *F24F 11/61* (2018.01); *F24F 11/62* (2018.01);
(Continued)

(58) Field of Classification Search
CPC .. F24F 11/30; F24F 11/52; F24F 11/00; F24F 11/85; F24F 11/61; F24F 11/77;
(Continued)

(56) References Cited

U.S. PATENT DOCUMENTS 4,381,075 A 4/1983 Cargill et al.
4,387,763 A 6/1983 Benton
(Continued)

FOREIGN PATENT DOCUMENTS

EP 1564513 A1 8/2005

OTHER PUBLICATIONS

David M. Bezesky and Scott Kreitzer, "NEMA Application Guide for AC Adjustable Speed Drive Systems" (2001), IEEE/PCOC 2001 Conference Record, http://www.industry.usa.siemens.com/drives/us/en/electric-motor/anema-motors/specification/Documents/nema-application-guide.pdf.
(Continued)

*Primary Examiner* — Emmanuel E Duke
(74) *Attorney, Agent, or Firm* — The Salerno Law Firm, P.C.

(57) ABSTRACT

An HVAC system includes an indoor unit, an outdoor unit, a thermostat, and a remote control device. The indoor unit comprises a first variable speed drive (VSD) to control a speed of HVAC rotary components within the indoor unit, and the outdoor unit comprises a second VSD to control a speed of HVAC rotary components within the outdoor unit. The thermostat in communication with the indoor unit and the outdoor unit comprises a communication interface, and a system controller in communication with the communication interface. The remote control device transmits a signal to the system controller to alter the speed of the HVAC rotary components, where the HVAC rotary components operate at a high speed mode which is above the preset speed
(Continued)

limit of the respective HVAC rotary component to achieve an enhanced cooling mode.

22 Claims, 9 Drawing Sheets

Related U.S. Application Data

(60) Provisional application No. 62/329,756, filed on Apr. 29, 2016.

(51) Int. Cl.
| | | |
|---|---|---|
| *F24F 11/85* | (2018.01) | |
| *F24F 11/61* | (2018.01) | |
| *F24F 11/77* | (2018.01) | |
| *F24F 11/62* | (2018.01) | |
| *F24F 11/83* | (2018.01) | |
| *F24F 11/52* | (2018.01) | |
| *F24F 110/10* | (2018.01) | |

(52) U.S. Cl.
CPC .............. *F24F 11/77* (2018.01); *F24F 11/83* (2018.01); *F24F 11/85* (2018.01); *F24F 13/24* (2013.01); *F24F 2110/10* (2018.01)

(58) Field of Classification Search
CPC .. F24F 11/62; F24F 11/83; F24F 13/24; F24F 2110/10
See application file for complete search history.

(56) References Cited

U.S. PATENT DOCUMENTS

| | | | |
|---|---|---|---|
| 4,589,060 A | 5/1986 | Zinsmeyer | |
| 4,718,021 A | 1/1988 | Timblin | |
| 5,462,225 A | 10/1995 | Massara et al. | |
| 5,673,568 A * | 10/1997 | Isshiki | F25B 13/00 |
| | | | 62/228.4 |
| 6,659,726 B2 | 12/2003 | Holden | |
| 7,555,364 B2 | 6/2009 | Poth et al. | |
| 7,789,632 B2 | 9/2010 | Rival | |
| 7,795,827 B2 | 9/2010 | Jeung | |
| 7,797,080 B2 | 9/2010 | Durham, III | |
| 7,899,579 B2 | 3/2011 | Durham, III | |
| 8,011,199 B1 * | 9/2011 | Chen | F25B 49/022 |
| | | | 62/228.5 |
| 8,078,325 B2 | 12/2011 | Poth | |
| 8,352,083 B2 | 1/2013 | Ng | |
| 9,832,034 B2 * | 11/2017 | Shetty | F24F 11/30 |
| 2004/0177629 A1 | 9/2004 | Eoga | |
| 2005/0278071 A1 | 12/2005 | Durham | |
| 2007/0043478 A1 | 2/2007 | Ehlers et al. | |
| 2012/0310418 A1 | 12/2012 | Harrod et al. | |
| 2012/0316711 A1 | 12/2012 | Christian et al. | |
| 2013/0158715 A1 | 6/2013 | Barton et al. | |
| 2014/0012422 A1 | 1/2014 | Kates | |
| 2014/0131009 A1 | 5/2014 | Zhou et al. | |
| 2014/0219642 A1 | 8/2014 | Helt | |
| 2014/0277758 A1 | 9/2014 | Wasson et al. | |
| 2014/0343733 A1 | 11/2014 | Turner et al. | |
| 2017/0074536 A1* | 3/2017 | Bentz | G06F 3/017 |

OTHER PUBLICATIONS

J. Robert Howard, "Drive Your HVAC System to High Performance" (Jul. 24, 2012), https://www.buildings.com/article-details/articleid/14430/title/drive-your-hvac-system-to-high-performance.

"Operating Motors at Higher Speeds than their Nameplate Speed—Can it Be Done?" Delta Automation, Inc. Blog, (Mar. 11, 2014), https://deltaautomation.wordpress.com/2014/03/11/operating-motors-at-higher-speeds-than-their-nameplate-speed-can-it-be-done/.

Jacob Nielson, "Variable Speed Compressors CHange the Game for HVAC/R Industry", Appliance Design, (Apr. 3, 2014), https://www.appliancedesign.com/articles/93979-variable-speed-compressors-change-the-game-for-hvacr-Industry.

* cited by examiner

TIME-CONSTRAINED CONTROL OF AN HVAC SYSTEM

CROSS-REFERENCE TO RELATED APPLICATIONS

This application is a continuation of U.S. Utility patent application Ser. No. 15/499,833, now U.S. Pat. No. 10,203,127, entitled "TIME-CONSTRAINED CONTROL OF AN HVAC SYSTEM" and filed Apr. 27, 2017, which claims the benefit of and priority to U.S. Provisional Application Ser. No. 62/329,756 entitled "TIME-CONSTRAINED CONTROL OF AN HVAC SYSTEM" and filed Apr. 29, 2016, the entirety of each of which being hereby incorporated by reference herein for all purposes.

BACKGROUND

1. Technical Field

The present disclosure relates to control systems for an air conditioner or heat pump system, and more particularly, to an HVAC controller that can be used to selectively control the speed of rotary equipment in the HVAC system.

2. Background of Related Art

Typically, variable speed drives (VSD) are used to control fan and compressor speeds of an HVAC system. Conventional variable speed heating, ventilation, and air conditioning (HVAC) systems have factory-programmed high cooling speeds which are less than the actual maximum cooling speed the HVAC system is capable of providing. This prevents the system from operating at maximum speed thereby ensuring increased component life, reliability, and lower energy consumption. Additionally, this practice matches the cooling and heating capacities to the requested performance specifications; to establish rated capacity and efficiency performance levels for the equipment; and to achieve compliance with industry standards such as AHRI performance auditing.

However, there are instances when a user may desire maximum cooling despite any limitations designed into the system. For example, consider a user who travels for most of the day in hot and humid weather who, upon returning home, requires the air-conditioned space to be at a comfortable temperature as soon as possible. In another scenario, consider a user who wishes to enjoy additional cooling during special occasions such as parties or family gatherings, during periods of extreme heat or humidity, and so forth. An HVAC system which overcomes the above-mentioned shortcomings would be a welcome advance in the art.

SUMMARY

An HVAC system disclosed herein is configured to control speed of HVAC rotary components. The HVAC system comprises an indoor unit, an outdoor unit, a thermostat, and a remote control device. The indoor unit comprises a first variable speed drive to control a speed of one or more HVAC rotary components within the indoor unit, and the outdoor unit comprises a second variable speed drive to control a speed of one or more HVAC rotary components within the outdoor unit. The thermostat in communication with the indoor unit and the outdoor unit, and comprises a communication interface and a system controller. The system controller is in communication with the communication interface to transmit a signal from a remote control device to the HVAC rotary components in the indoor unit and the outdoor unit. The remote control device is in communication with the thermostat via a communication network, where the remote control device is configured to transmit a signal to the system controller to alter the speed of one or more HVAC rotary components of the indoor unit and the outdoor unit, wherein one or more of the HVAC rotary components are configured to operate at a high speed mode which is above the rated speed of that HVAC rotary component to induce an enhanced ("turbo") cooling mode in a room, and at a low speed ("quiet") mode to reduce the noise generated from the HVAC rotary components.

In an embodiment, the HVAC rotary component of indoor unit is an indoor unit blower motor. In an embodiment, the HVAC rotary components of outdoor unit comprise a outdoor unit fan motor, and a compressor motor. In an embodiment, the high-speed mode to induce enhanced cooling mode in the room is enabled for a predefined time duration after which the HVAC system reverts to a normal operation speed. In an embodiment, when the predefined time duration for enhanced cooling mode in the room is completed, a subsequent enhanced cooling mode is restricted to be restarted until the expiration of a pre-set delay time. In an embodiment, the enhanced cooling mode is canceled or disabled in response to a demand curtailment request received from a utility. In an embodiment, the HVAC system further comprises permitting a daily cooling budget for the predefined time duration of the enhanced cooling mode as prescribed by the user. In an embodiment, an unused portion of the daily cooling budget is carried forward over to the corresponding day if the predefined time duration of the enhanced cooling mode is not covered on a particular day. In an embodiment, during the low speed mode, the HVAC system is configured to run at a lower speed than a regulated speed, which is required to maintain a minimum set point temperature. In one embodiment, the user is able to specify how far off the minimum set point temperature they are willing to compromise in order to maintain low speed mode.

In an embodiment, the thermostat further comprises a user interface configured for a user to communicate with the indoor unit and the outdoor unit via the system controller, where the user can adjust the high-speed mode and the low-speed mode of the HVAC components. In an embodiment, the user is authorized to enter a range of values into the minimum set point temperature via the user interface of the thermostat. In an embodiment, the thermostat further comprises a temperature sensor configured to sense an ambient temperature in the room, where the temperature sensor provides a feed to the system controller, which transmits the feed to the indoor unit to alter the speed of the indoor blower motor. In an embodiment, the outdoor unit further comprises a low speed mode user interface configured for a user to directly access the low speed mode user interface from outdoors, where the user can directly set the HVAC rotary components at low speed mode. In an embodiment, the low speed mode user interface is configured to restrict access to the low speed mode to an authorized user.

In another aspect, a method of controlling the speed of HVAC rotary components is disclosed. In an exemplary embodiment, the method includes providing an HVAC system comprising an indoor unit, an outdoor unit, a thermostat, and a remote control device. A signal from the remote control device is transmitted via the system controller to one or more HVAC rotary components in the indoor unit and the outdoor unit, and the speed of the HVAC rotary components of the indoor unit and the outdoor unit is altered by receiving the transmitted signal from the remote control device. The HVAC rotary components are operated at a high-speed mode, which is above the rated speed of that HVAC rotary component to induce an enhanced cooling mode in a room, and the HVAC rotary components are operated at a low speed mode to reduce the noise generated from the HVAC rotary components.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure, wherein.

Figure 1:
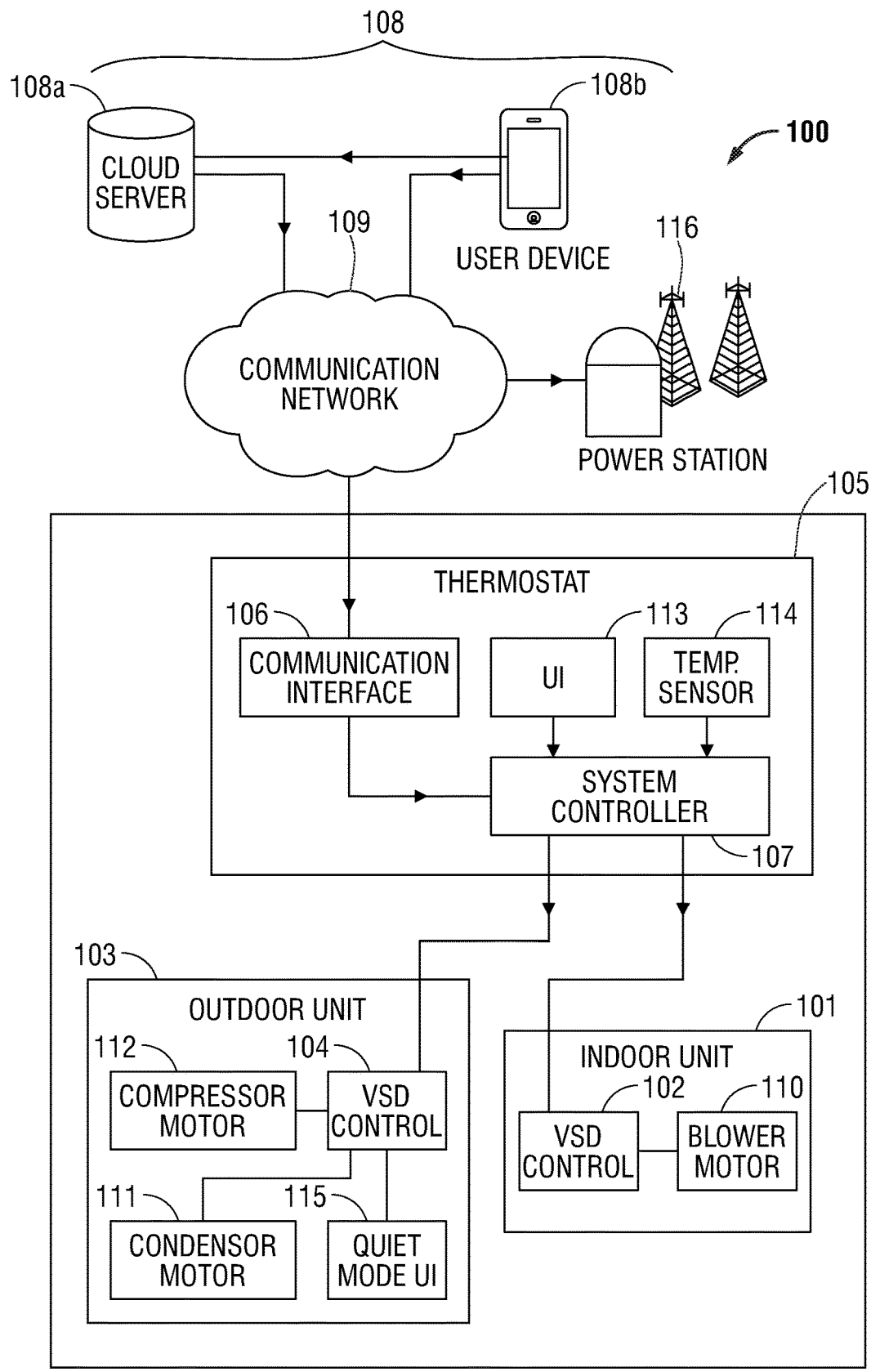
FIG. 1 is a schematic diagram of an HVAC system in accordance with an embodiment of the present disclosure.

The various aspects of the present disclosure mentioned above are described in further detail with reference to the aforementioned figures and the following detailed description of exemplary embodiments.

DETAILED DESCRIPTION

The present disclosure is directed to an HVAC system having time-constrained selective speed control of HVAC rotary components such as a fan, a compressor motor, and/or a blower. In an embodiment, the HVAC system includes an indoor unit, an outdoor unit, a thermostat, and a remote control device. The indoor unit of the conventional HVAC system includes a first variable speed drive (VSD) to control a speed of the HVAC rotary components in the indoor unit. The outdoor unit includes a second variable speed drive to control a speed of the HVAC rotary components in the outdoor unit. The thermostat is in communication with the indoor unit and the outdoor unit, and contains a communication interface and a system controller.

The system controller is in communication with the communication interface to convey a signal from a remote control device to the HVAC rotary components in the indoor unit and the outdoor unit. The remote control device is in remote contact with the thermostat via a communication network, where the remote control device transmits a signal to the system controller to modify the speed of the HVAC rotary components of the indoor unit and the outdoor unit, where one or more of the HVAC rotary components operate at a high speed mode which is above the rated speed of that HVAC rotary component to induce an enhanced cooling mode in a room, and at a low speed mode to reduce the noise generated from the HVAC rotary components.

Particular illustrative embodiments of the present disclosure are described herein below with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements, which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

Referring to FIG. 1, an HVAC system 100 is configured to control speed of HVAC rotary components. The HVAC system 100 comprises an indoor unit 101, an outdoor unit 103, a thermostat 105, and a remote control device 108. The indoor unit 101 comprises a first variable speed drive 102 to control a speed of one or more HVAC rotary components within the indoor unit 101, and the outdoor unit 103 comprises a second variable speed drive 104 to control a speed of one or more HVAC rotary components within the outdoor unit 103. As used herein, a "variable-speed drive" (VSD) refers to equipment used to control the rotational speed of an electric motor.

Several basic types of VSDs are in current use depending on motor application. For example, a variable frequency drive (VFD) controls the speed of an AC induction motor by varying the motor's supplied voltage and frequency of power. Other VSD designs commonly used today include pulse width modulation (PWM), current source inverter (CSI), voltage source inverter (VSI) designs, and stepped multiple-speed designs. The PWM drive is widely used in HVAC systems because it is highly reliable, cost-effective, reflects the least amount of harmonics back into its power source, and works well with motors ranging in size from about ½ horsepower (hp) to 500 hp. Some VSD designs provide for infinitely variable speed adjustment of motor speed, while others, sometimes referred to as "multiple speed drives," provide a finite number of discrete motor speeds (e.g., low-medium-high). Embodiments of the present disclosure may be utilized with any VSD design.

As further shown in FIG. 1, the thermostat 105 is in communication with the indoor unit 101 and the outdoor unit 103, and comprises a communication interface 106 and a system controller 107. The system controller 107 is in communication with the communication interface 106 to transmit a signal from a remote control device 108 to the HVAC rotary components in the indoor unit 101 and the outdoor unit 103. The remote control device 108, for example, a smart phone or a cloud service, is in communication with the thermostat 105 via a communication network 109, where the remote control device 108 is configured to transmit a signal to the system controller 107 to alter the speed of one or more HVAC rotary components of the indoor unit 101 and the outdoor unit 103 via the first variable speed drive 102 and/or the second variable speed drive 104, where the HVAC rotary components operate at a high speed mode, or a boost mode, which is above the rated speed of that HVAC rotary component to induce an enhanced cooling mode in a room, and at a low speed mode, or a quiet mode, to reduce the noise generated from the HVAC rotary components. In an embodiment, the thermostat 105 further comprises a user interface 113 configured for a user to communicate with the indoor unit 101 and the outdoor unit 103 via the system controller 107, where the user can adjust the high speed mode and the low speed mode of the HVAC components (FIGS. 2A-2D). The user may activate the enhanced cooling mode feature manually through the user interface 113 of the thermostat 105, or through a smart phone app 108b that communicates with the thermostat 105 either through a direct or peer-to-peer connection, or through a cloud-based service 108a. The quiet mode feature may be activated in the same manner.

In an embodiment, the HVAC rotary component of indoor unit 101 includes an indoor blower motor 110. In an embodiment, the HVAC rotary components of outdoor unit 103 include an outdoor fan motor 111 and a compressor motor 112. In an embodiment, the high-speed mode or boost mode to induce enhanced cooling mode in the room is enabled for a predefined time duration after which the HVAC system 100 reverts to a normal operation speed. The boost mode is only operated for a stipulated time in order to avoid prolonged excessive loads or energy consumption of the equipment because of continuous operation above the rated speed of operation. That is, enhanced cooling mode is enabled only for a pre-specified time duration, for example and without limitation, 30 minutes, before the system reverts to normal operation. Thus, all performance rating data should remain unchanged as well as system operation for performance audit testing of the HVAC system 100. In an embodiment, the outdoor unit 103 further comprises a quiet mode user interface 115 configured for a user to directly access the low speed mode user interface 115 from outdoors, where the user can directly set the HVAC rotary components at quiet mode. Here, an outdoor user can activate the quiet mode by simply walking up to the outdoor unit 103 and pressing a quiet button. In an embodiment, activating the quiet mode function at the outdoor unit 103 comprises the user entering a security code or password into the low speed mode user interface 115 to authenticate the user, which avoids unwanted activation of the quiet mode.

Figure 2A:
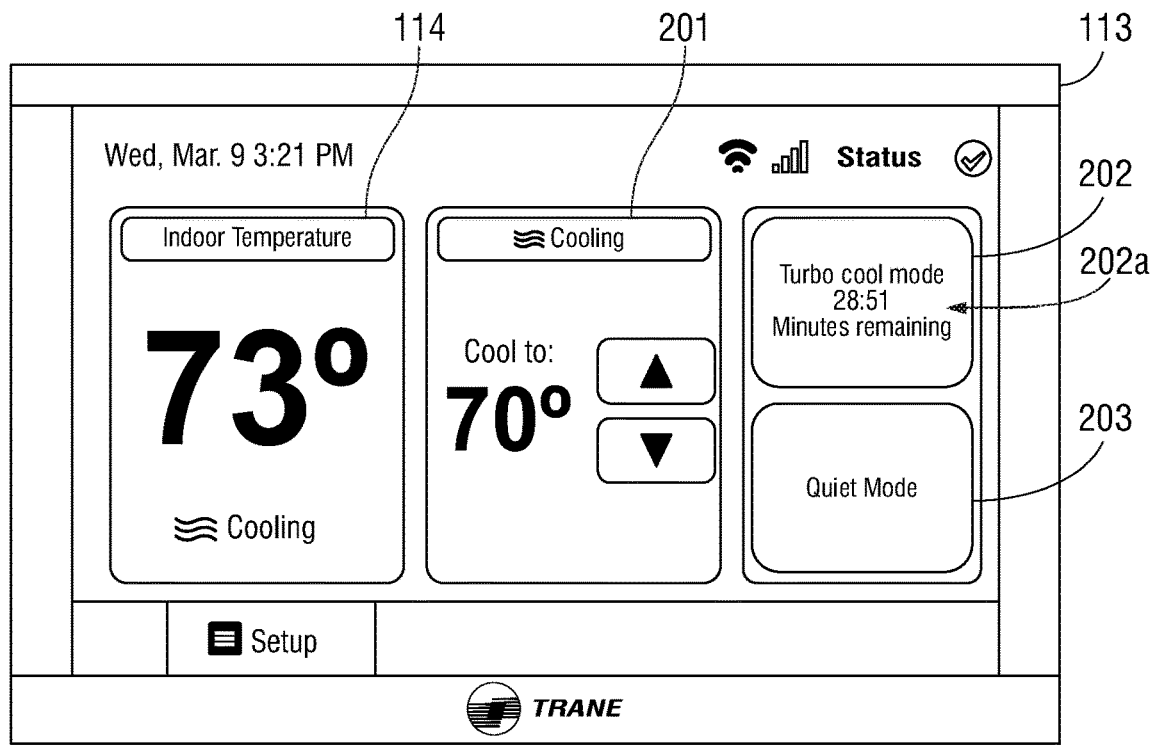
FIGS. 2A-2D illustrate a user interface of a thermostat of an HVAC system in accordance with an embodiment of the present disclosure.
Figure 2B:
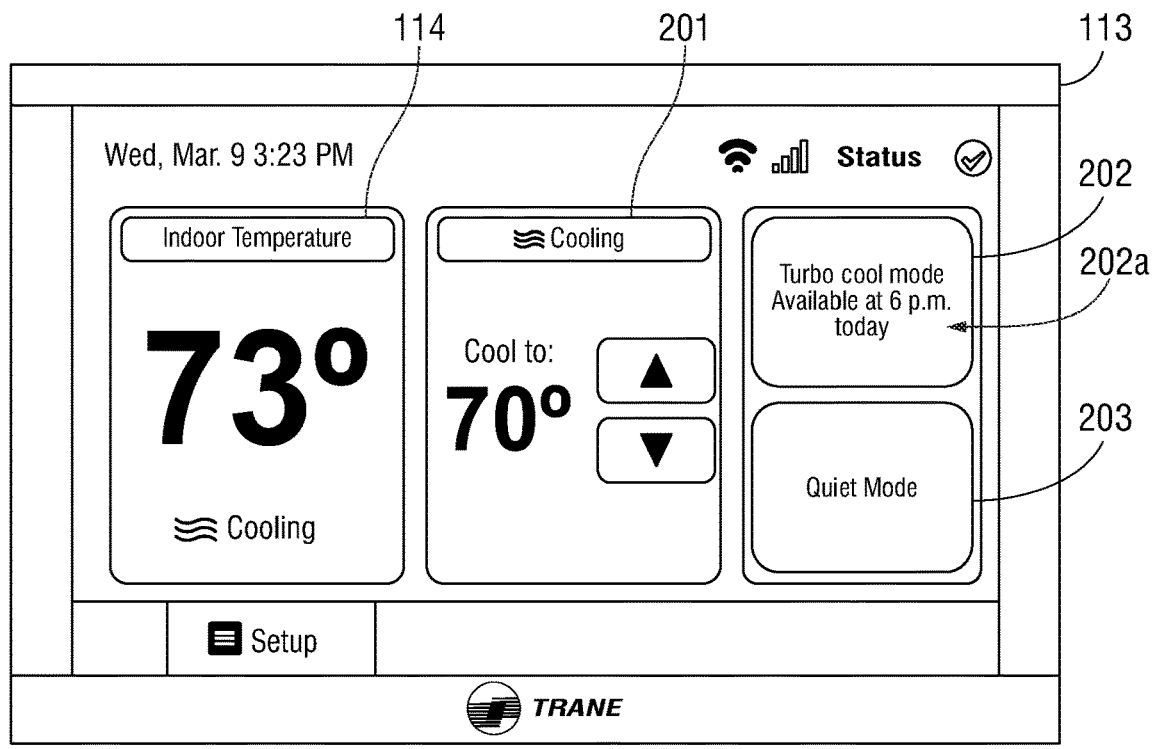
Figure 2C:
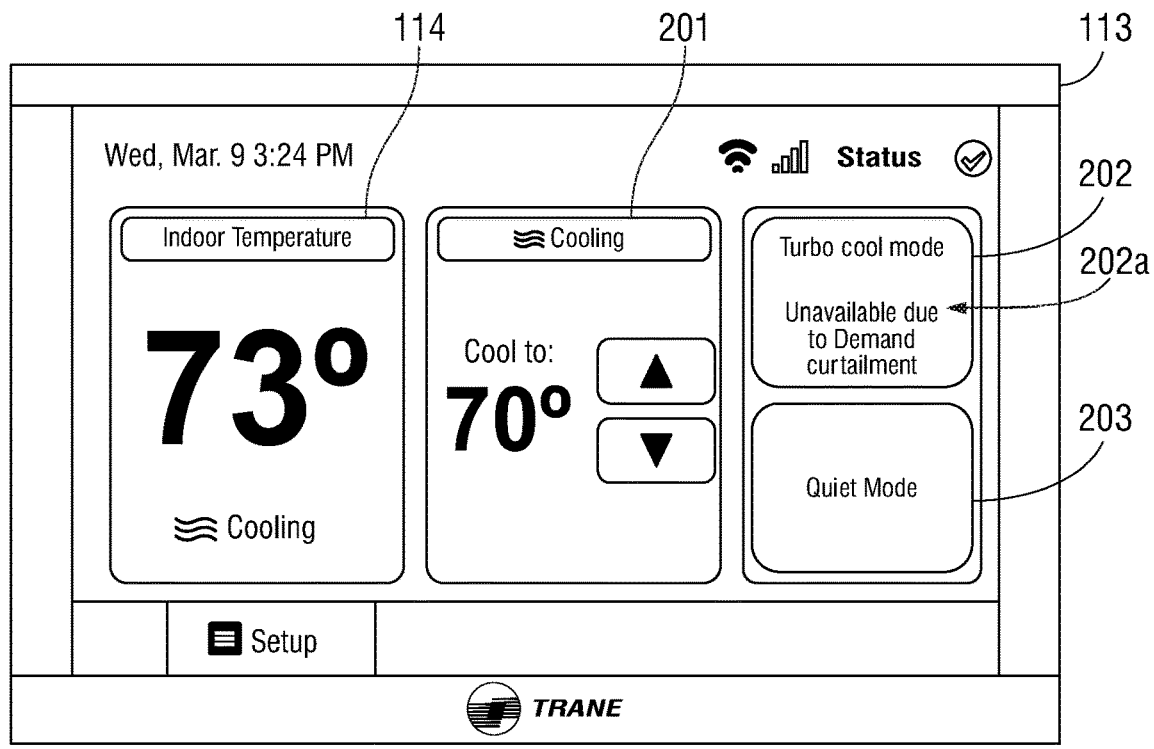

Referring to FIGS. 2A-2D, an example embodiment of a user interface 113 of the thermostat 105 of HVAC system 100 is illustrated. In the example embodiment, the user is authorized to enter a range of values into the temperature setting control 201 where the user can set the desired temperature during boost mode or quiet mode. In one embodiment, the user is able to specify how far off the set point temperature they are willing to compromise in order to maintain low speed mode. Thermostat 105 further comprises a temperature display 114 configured to display the sensed ambient temperature in the room. The sensed temperature is provided to the system controller 107 which, in turn, transmits a control signal to the indoor unit 101 to alter the speed of the indoor blower motor 110. As shown in FIGS. 2A-2C, user interface 113 includes enhanced mode control 202 and quiet mode control 203. Enhanced mode control 202 incorporates a display element 202a which indicates the current enhanced mode status. For example, in FIG. 2A display element 202a shows the time remaining for the boost mode or the enhanced cool mode to finish, for example, 28 minutes and 51 seconds. In FIG. 2B, display element 202a shows the next available set time for boost mode to be activated again, and in FIG. 2C, display element 202a indicates the unavailability of boost mode due to demand curtailment from the electric utility 116.

Figure 2D:
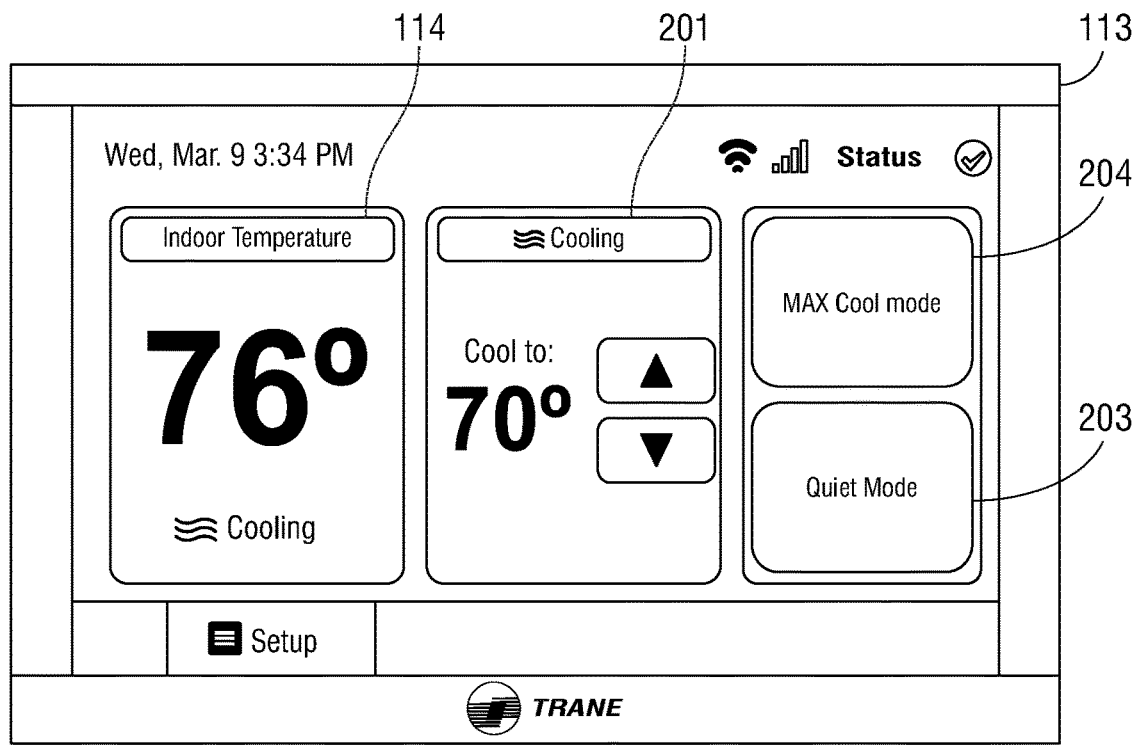

Referring to FIG. 2D, which shows a UI for the max cool mode which includes max mode control 204. Max mode operates similarly to enhanced mode, but without any limitations such as, for example, no limited time of operation, no daily budgeted mode of operation, or no restrictions due to a demand curtailment request. This mode enables the user to override the preprogrammed HVAC system 100 limit whenever and for as long as the user wishes. In an example, variable speed thermostats ramp the system speed up and down. This ramp can take time depending on the measured temperature in the environment. A user may get frustrated with how slowly the variable speed system ramps up when there is an immediate need for maximum cooling. Max mode control 204 switches HVAC system 100 into maximum speed with no ramp time. Max mode may remain in effect until the max mode control 204 is pressed again to cancel max mode. In some embodiments, max mode may be canceled after a user-selectable predetermined period of time has elapsed, and/or re-activated at any time.

In an embodiment, when the predefined time duration for enhanced cooling mode in the room is completed, a subsequent enhanced cooling mode is restricted from restarting or re-initiated until the expiration of a pre-set delay time, for example and without limitation, about 8 hours. In an embodiment, the enhanced cooling mode is canceled or disabled in response to a demand curtailment request received from an electric utility 116. In an embodiment, the HVAC system 100 comprises a daily cooling budget of a predefined time duration of the enhanced cooling mode. In one non-limiting example, a maximum of 90 minutes of enhanced cooling is permitted per day to be used as desired. In an embodiment, an unused portion of the daily cooling budget is carried forward over to the corresponding day if the predefined time duration of the enhanced cooling mode is not used on a particular day. In an embodiment, the unused portion available to be carried over cannot exceed one day's allocation time. This ensures a user cannot bank essentially limitless enhanced time during, for example, off seasons when cooling is not required.

The thermostat 105 includes the user interface 113 to provide access to boost mode and amount of boost mode time remaining. In another embodiment, the system controller 107 maintains boost mode parameters and communicates boost mode status to the thermostat 105. In another embodiment, the thermostat 105 maintains boost mode status, such as, time remaining. The system controller 107 and/or thermostat 105 may be in communication with the local electric company to receive a demand curtailment request and inhibit boost mode in accordance with the demand curtailment event. The boost mode parameters, for example, time limits, daily maximums etc., are stored in an unmodifiable memory, that is, factory-set, no user access (or user read-only access), encrypted, and/or permanent. In some embodiments, boost mode parameters may be modifiable only by authorized service personnel.

In an embodiment, a quiet "low speed" mode is provided in which the HVAC system 100 is configured to run at a lower speed than that is required to maintain a minimum set point temperature. Since conventional systems have fans which may operate continuously, quiet mode enables the user to enjoy a quieter environment, for example, to reduce noise from the outdoor unit during outdoor parties, barbeques, or to reduce indoor noise during teleconferences or recording sessions, and the like. In an embodiment, quiet mode allows the user to specify a maximum allowable temperature offset from the set point, for example, about 4 degrees warmer than set point in order to enable the system to run at a slower quieter speed than normal. There is no limit on the number of times quiet mode may be invoked, although the user may optionally specify a time limit for quiet mode cycle. When maximum temperature offset is reached, the system controller 107 increases speed only as much as needed to maintain the offset temperature. In some embodiments, quiet mode may be invoked in accordance with a schedule to accommodate recurring events as child nap times, study periods, and/or to comply with local sound level regulations.

Figure 3A:
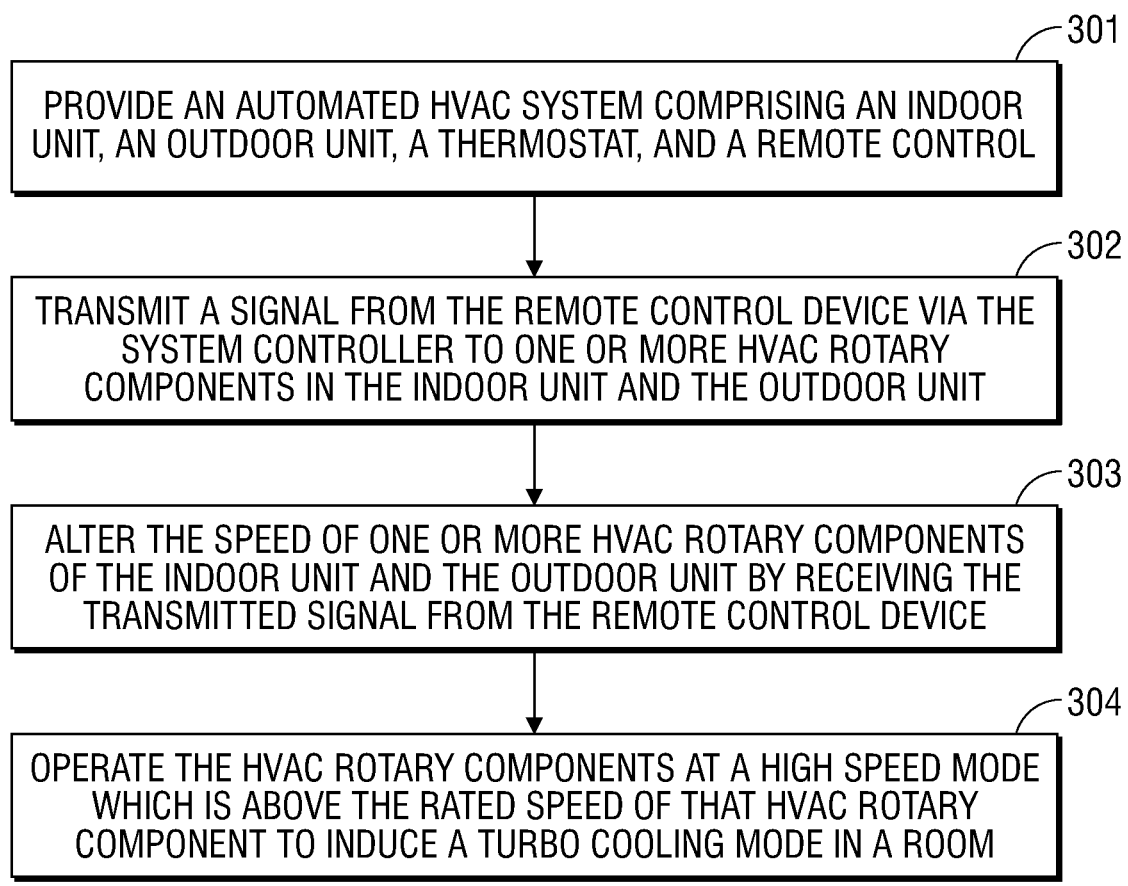
FIGS. 3A-3B illustrate methods to control speed of HVAC rotary components in accordance with an embodiment of the present disclosure.

Turning now to FIG. 3A, a method 300 of controlling a high-speed mode of HVAC rotary components in accordance with an embodiment of the present disclosure is shown. The method to control high speed mode of HVAC rotary components 300 includes providing 301 an HVAC system 100 having an indoor unit 101, an outdoor unit 103, a thermostat 105, and a remote control device 108. A signal from thermostat 105 and/or remote control device 108 is transmitted 302 via the system controller 107 to one or more HVAC rotary components in the indoor unit 101 and the outdoor unit 103, and the speed of the HVAC rotary components of the indoor unit 101 and the outdoor unit 103 is altered 303 in response to receiving the transmitted signal from the remote control device 108. The HVAC rotary components are operated 304 at a high-speed mode, which is above the rated speed of that HVAC rotary component to induce an enhanced cooling mode in a room.

In embodiments, use of remote control device 108 is optional, and embodiments are contemplated which utilize a thermostat or controller provided by indoor unit 101. In embodiments, the HVAC rotary components are controlled from a remote server or a cloud-based service.

Figure 3B:
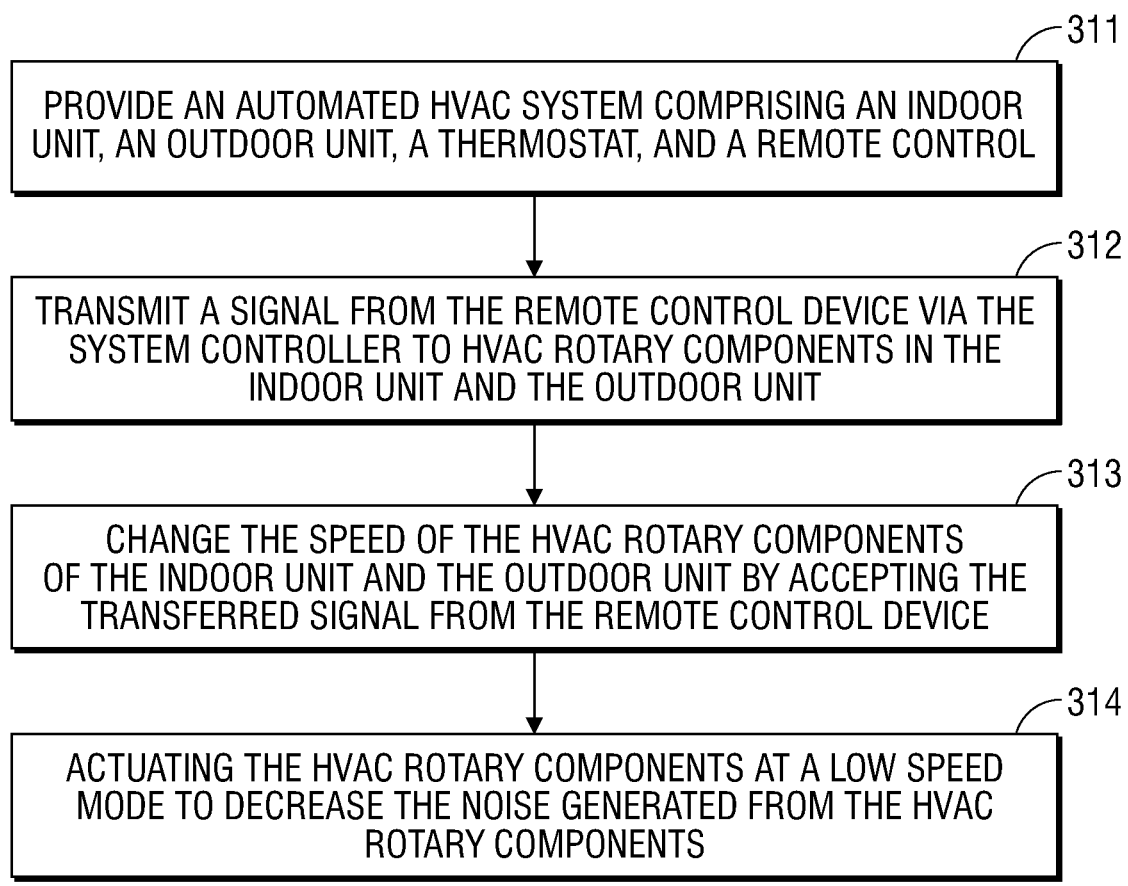

Referring to FIG. 3B, a method 310 of controlling a low speed mode of HVAC rotary components in accordance with an embodiment of the present disclosure is shown. The disclosed method to control low speed mode of HVAC rotary components 310 includes providing 311 an HVAC system 100 having an indoor unit 101, an outdoor unit 103, a thermostat 105, and a remote control device 108. A signal from thermostat 105 and/or remote control device 108 is transferred 312 via the system controller 107 to the HVAC rotary components in the indoor unit 101 and the outdoor unit 103, and the speed of the HVAC rotary components of the indoor unit 101 and the outdoor unit 103 is changed 313 by accepting the transferred signal from the remote control device 108. The HVAC rotary components are actuated 314 at a low speed mode to reduce the noise generated from the HVAC rotary components.

Figure 4A:
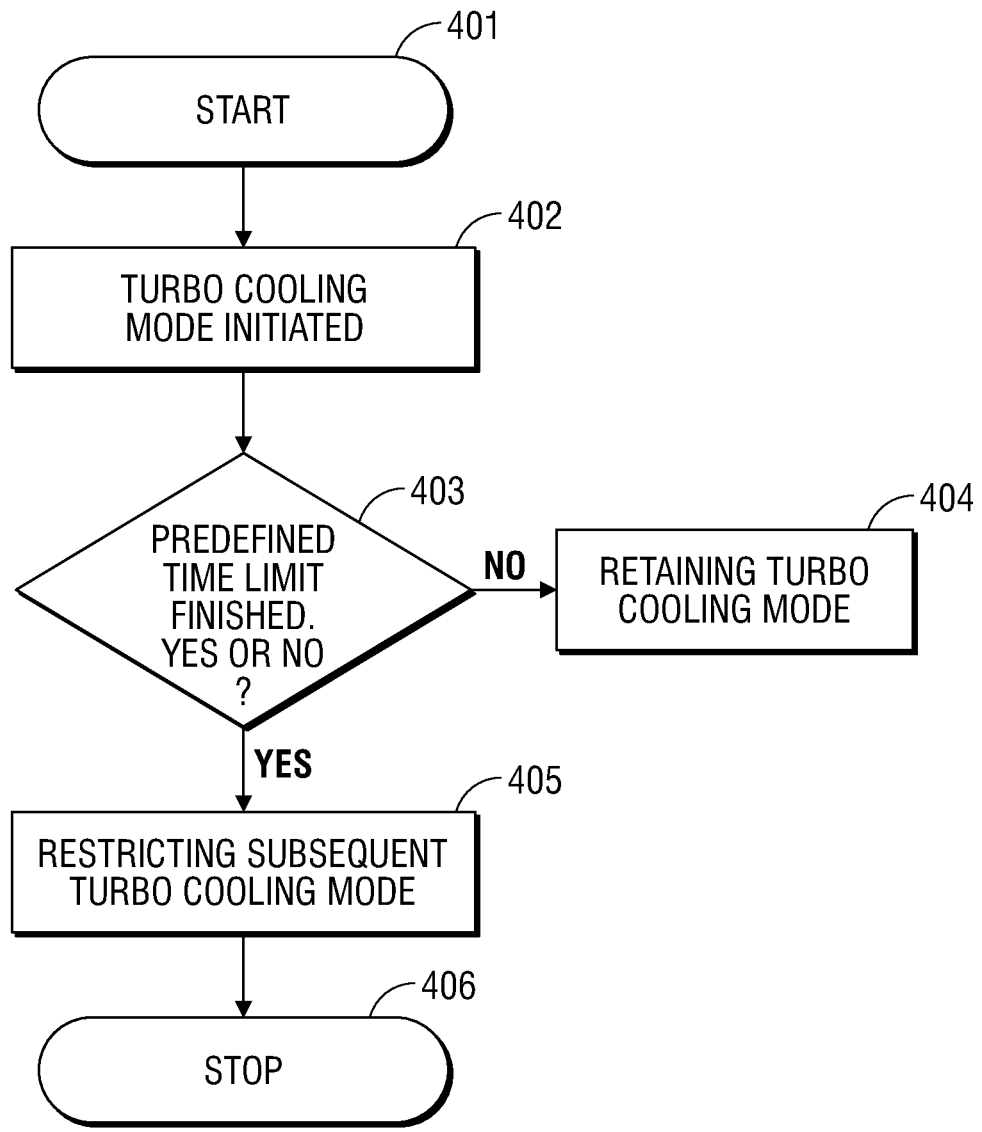
FIGS. 4A-4D illustrate flowcharts describing a time-constrained operating mode of the HVAC system, time availability for an enhanced cooling mode, demand curtailment check, and max mode of operation in accordance with embodiments of the present disclosure.

Referring now to FIGS. 4A-4D, which illustrate embodiments describing time constrained operation of the HVAC system, time availability for enhanced cooling mode, demand curtailment check, and max mode of operation. As shown in FIG. 4A and in FIG. 2A, the user starts 401 and initiates the enhanced cooling mode 402 of the HVAC system 100. Then, as discussed above with reference to FIGS. 2A-2D, the remaining time limit 403 for the enhanced cooling mode to finish is checked. If the time limit has not expired, i.e., it has not finished, then the HVAC system 100 remains 404 in enhanced cooling mode. If the predefined time limit 403 has expired, then enhanced mode is ended 405 and the system returns to normal speed (i.e., the normal high speed limit is again imposed) and the HVAC system 100 restricts 406 entry into a subsequent enhanced cooling mode. In the example embodiment shown, enhanced mode is restricted for a predetermined period of time (e.g., 8 hours).

Figure 4B:
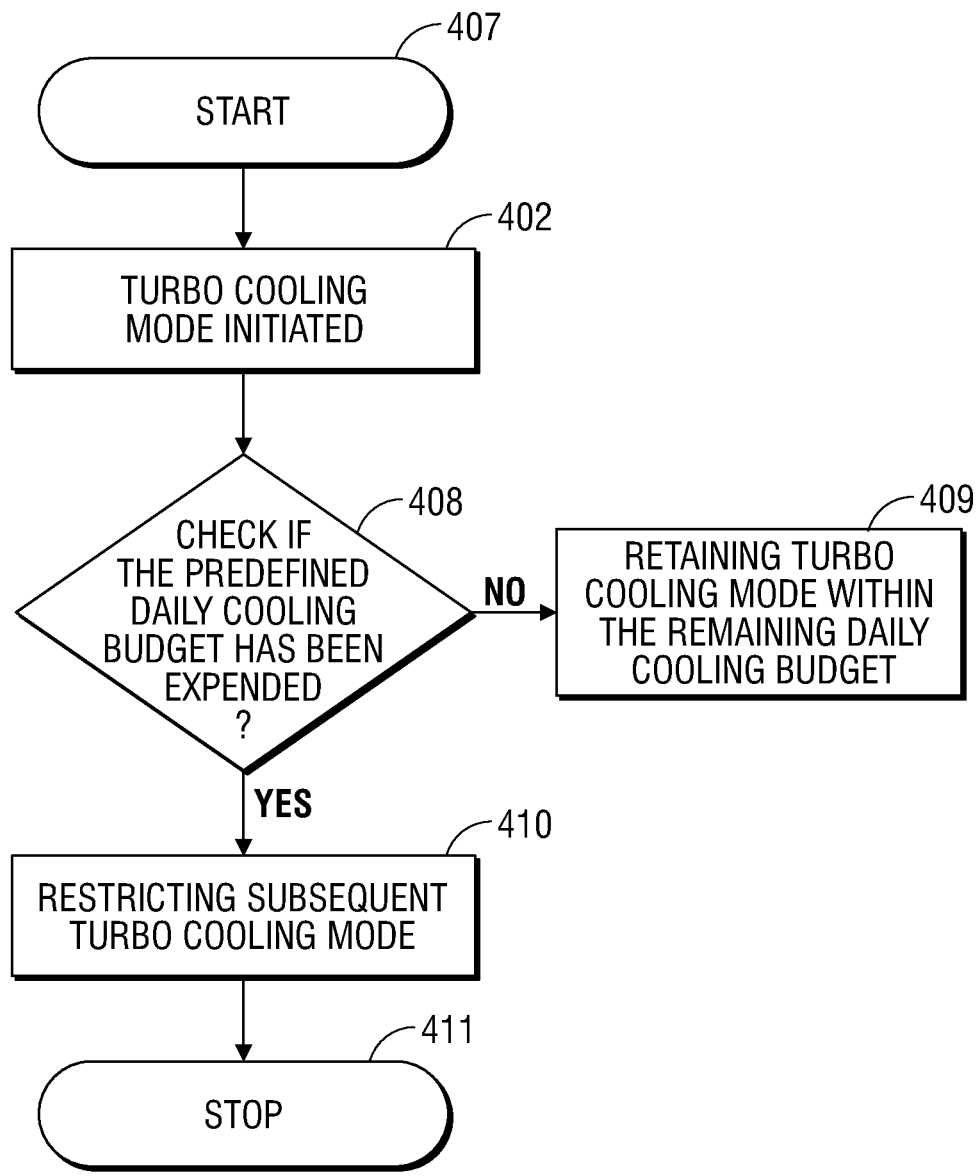

As shown in FIG. 4B and in FIG. 2B, the user starts 407 and initiates 402 enhanced cooling mode. Then the system checks 408 if the predefined daily cooling budget, for example, 90 minutes, is completed or not. If it is not completed, then the HVAC system 100 retains 409 enhanced cooling mode within the remaining daily cooling budget, however, if the predefined daily cooling budget is completed, then the HVAC system 100 exits enhanced mode 410 and restricts 411 subsequent enhanced cooling mode until the next day.

Figure 4C:
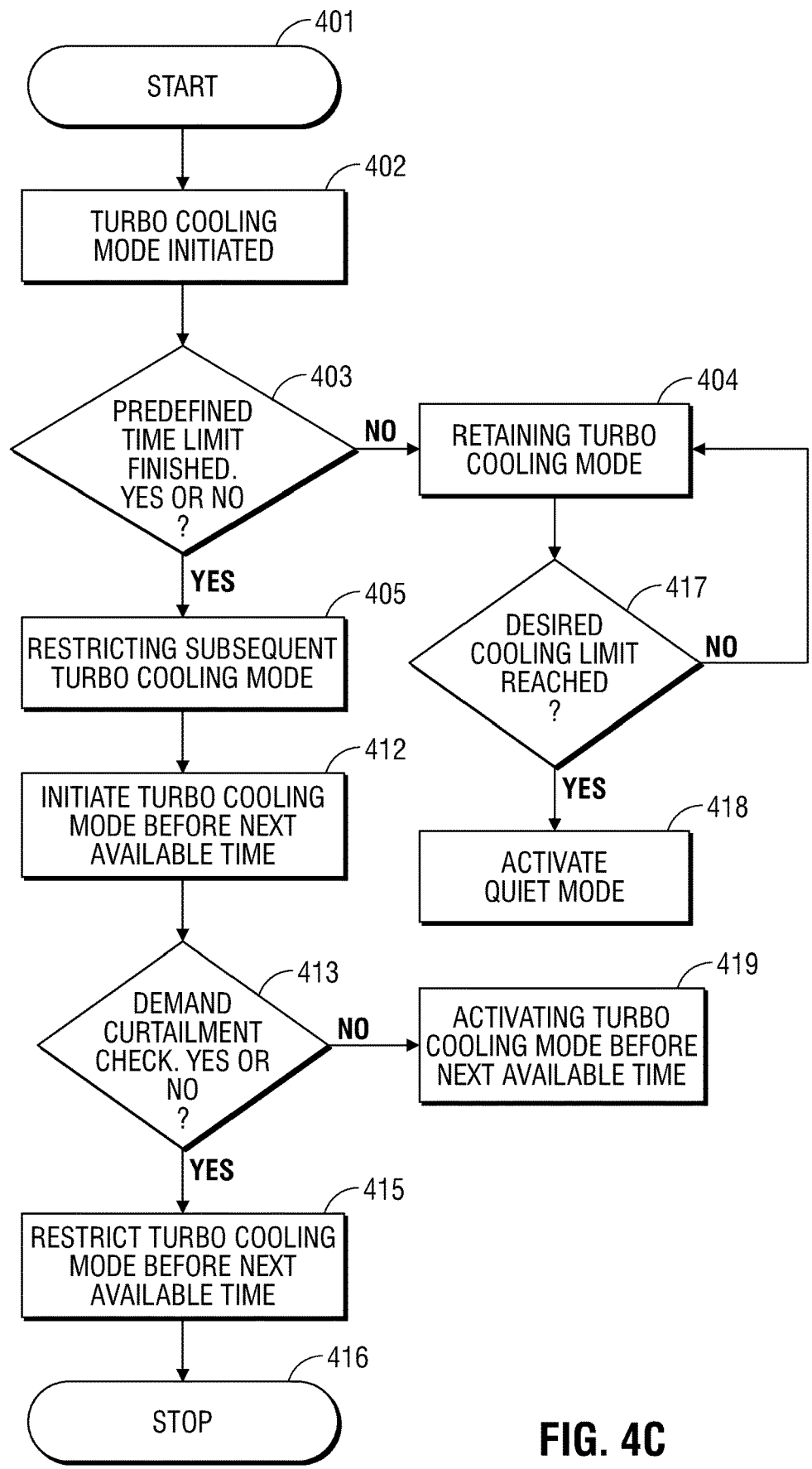

With reference now to FIG. 4C, and with continued reference to FIG. 4A and FIG. 2C, the predefined time limit 403 for the enhanced cooling mode to finish is checked. If it has not finished then the HVAC system 100 can remain 404 in enhanced cooling mode. If the predefined time limit 403 is finished, then the HVAC system 100 restricts 405 activation of a subsequent enhanced cooling mode in accordance with the desired strategy (e.g., enhanced re-activation wait time, daily budget, etc.). Here, after retaining 404 the enhanced cooling mode, if the desired cooling limit is reached 417, then the quiet mode may be activated 418. If the desired cooling limit is not reached 417, then the HVAC system 100 again remains 404 in enhanced cooling mode. Now, after the HVAC system 100 restricts 405 the subsequent enhanced cooling mode, if the enhanced cool mode is again initiated 412 before the next available time for enhanced cool mode, a demand curtailment check 413 is performed, and if the demand curtailment request is not received from the utility 116 provider, the enhanced cooling mode is activated 419 before next available time. On the other hand, if the demand curtailment request is received, then the enhanced cooling mode before next available time is restricted 415 by the HVAC system 100.

Figure 4D:
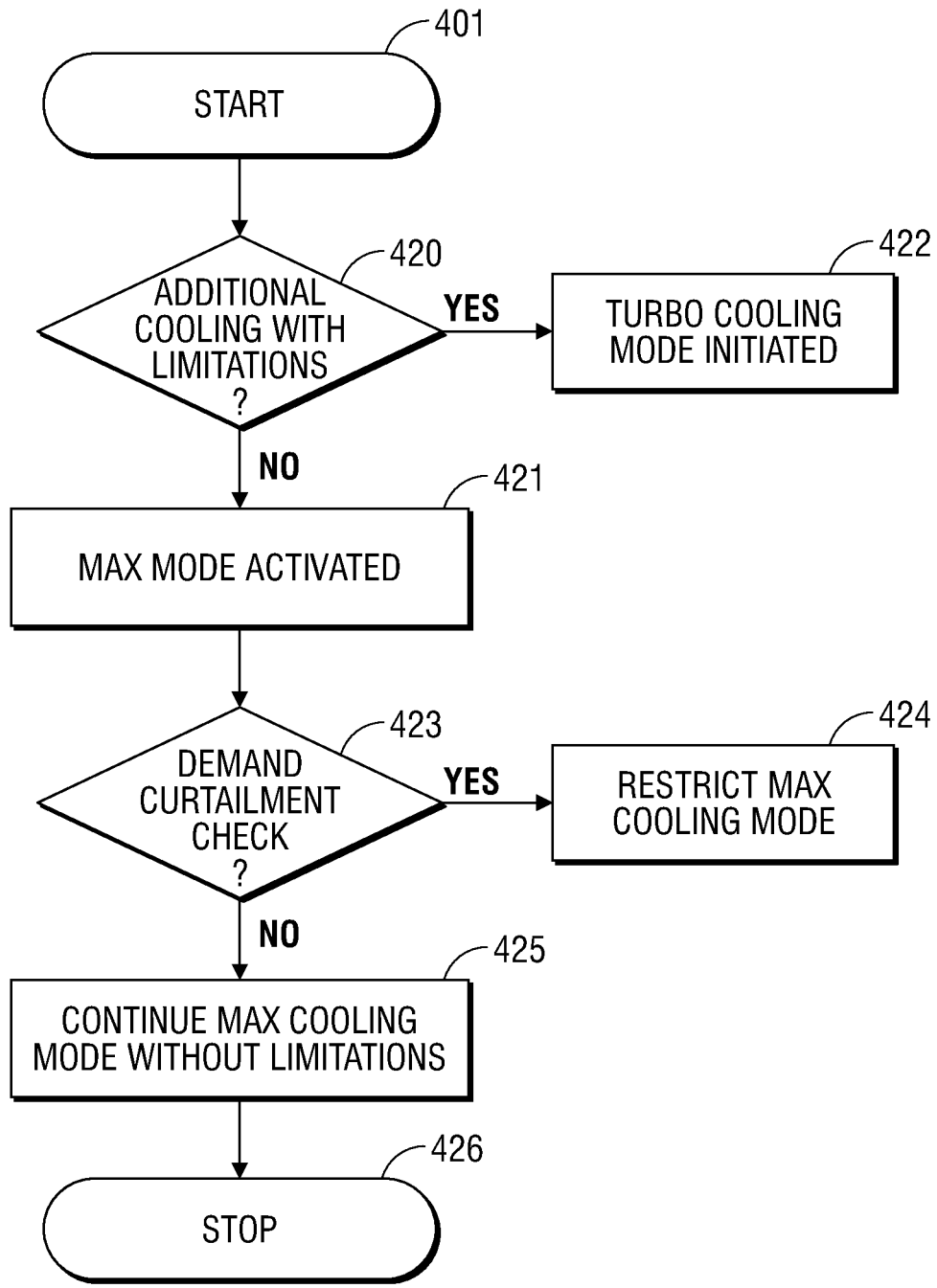

As shown in FIG. 4D, the user starts 401 by calling for additional cooling 420. If limitations are active, then the enhanced cooling mode is initiated 422 as described with reference to FIGS. 4A-4C. If limitations do not exist then max mode may be activated 421. The max mode is a modified version of the enhanced cool or boost mode 202, but without any limitations such as, for example, a stipulated time of operation such as 90 minutes with a regulated initiation time, a daily cooling budgeted mode of operation, or restrictions due to response to demand curtailment. After activating 421 the max mode, a demand curtailment check 423 is performed. If a demand curtailment is in effect, then max cooling mode is restricted (e.g., canceled or disallowed from activation). Conversely, if no demand curtailment is in effect, max cooling mode may continue without limitations 425 until such time max mode is terminated 426.

ASPECTS

It is noted that any of aspects 1-14 and 15-20 may be combined with any other in any combination.

Aspect 1. An HVAC system configured to control speed of HVAC rotary components, the HVAC system comprising an indoor unit comprising a first variable speed drive to control a speed of an indoor unit rotary component, the first variable speed drive including a speed limit that is below the maximum speed of the indoor unit rotary component; an outdoor unit comprising a second variable speed drive to control a speed of an outdoor unit rotary component, the second variable speed drive including a speed limit that is below the maximum speed of the outdoor unit rotary component; a thermostat in communication with the indoor unit and the outdoor unit, the thermostat configured to transmit a first control signal to the first variable speed drive and the second variable speed drive; wherein upon receiving the first control signal, the first variable speed drive and the second variable speed drive are configured to operate in a high speed mode which is above the speed limit of the respective rotary component thereof.

Aspect 2. The HVAC system in accordance with aspect 1, wherein the thermostat is further configured to transmit a second control signal to the first variable speed drive and the second variable speed drive, wherein upon receiving the second control signal, the first variable speed drive and the second variable speed drive are configured to operate in a low speed mode.

Aspect 3. The HVAC system in accordance with any of aspects 1-2, wherein the indoor unit rotary component comprises an indoor blower motor.

Aspect 4. The HVAC system in accordance with any of aspects 1-3, wherein the outdoor unit rotary component is selected from the group consisting of an outdoor fan motor and a compressor motor.

Aspect 5. The HVAC system in accordance with any of aspects 1-4, wherein the high speed mode is enabled for a predetermined time duration after which the HVAC system reverts to a normal speed mode.

Aspect 6. The HVAC system in accordance with any of aspects 1-5, wherein when the predefined time duration for enhanced cooling mode in the room is completed, a subsequent enhanced cooling mode is restricted from restarting until the expiration of a pre-set delay time.

Aspect 7. The HVAC system in accordance with any of aspects 1-6, wherein the enhanced cooling mode is canceled and/or disabled in response to a demand curtailment request received from a utility.

Aspect 8. The HVAC system in accordance with any of aspects 1-7, further comprising providing a predefined daily time budget for the enhanced cooling mode.

Aspect 9. The HVAC system in accordance with any of aspects 1-8, wherein an unused portion of the daily time budget is carried forward over to the following day.

Aspect 10. The HVAC system in accordance with any of aspects 1-9, wherein during the low speed mode, the HVAC system is configured to run at a lower speed than that which is required to maintain a minimum set point temperature.

Aspect 11. The HVAC system in accordance with any of aspects 1-10, wherein the thermostat further comprises a system controller; and a user interface configured for a user to communicate with the indoor unit and the outdoor unit via the system controller, wherein the user can initiate the high speed mode and/or the low speed mode of the HVAC components.

Aspect 12. The HVAC system in accordance with any of aspects 1-11, wherein the user interface is configured to facilitate entry of a maximum allowable deviation from a set point temperature.

Aspect 13. The HVAC system in accordance with any of aspects 1-12, wherein the outdoor unit further comprises a low speed mode user interface to enable a user to access the low speed mode at the outdoor unit.

Aspect 14. The HVAC system in accordance with any of aspects 1-13, wherein the low speed mode user interface is configured to restrict access to the low speed mode to an authorized user.

Aspect 15. A method to control speed of HVAC rotary components, comprising: providing an HVAC system comprising an indoor unit comprising a first variable speed drive to control a speed on an indoor unit rotary component, the first variable speed drive including a speed limit that is below the maximum speed of the indoor unit rotary component; an outdoor unit comprising a second variable speed drive to control a speed of an outdoor unit rotary component, the second variable speed drive including a speed limit that is below the maximum speed of the outdoor unit rotary component; a thermostat in communication with the indoor unit and the outdoor unit, the thermostat configured to transmit a first control signal to the first variable speed drive and the second variable speed drive; and transmitting the first control signal to the indoor unit rotary component and the outdoor unit outdoor unit rotary component to operate said rotary components at a high speed mode which is above the speed limit of said rotary components to effectuate an enhanced cooling mode.

Aspect 16. The method in accordance with aspect 15, further comprising operating the rotary components at a low speed mode to reduce the noise generated from the rotary components.

Aspect 17. The method in accordance with any of aspects 15-16, further comprising operating the rotary components at a lower speed than that which is required to maintain a set point temperature.

Aspect 18. The method in accordance with any of aspects 15-17, wherein inducing an enhanced cooling mode includes enabling the high speed mode for a predefined time duration after which the HVAC system reverts back to a normal operation speed.

Aspect 19. The method in accordance with any of aspects 15-18, further comprising restricting a subsequent enhanced cooling mode to be restarted until the expiration of a pre-set delay time.

Aspect 20. The method in accordance with any of aspects 15-19, further comprising canceling and/or disabling the enhanced cooling mode in response to a demand curtailment request received from a utility.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A heating, ventilation, and air conditioning (HVAC) system, comprising:
    an indoor unit comprising a first variable speed drive to control a speed of an indoor unit rotary component, the first variable speed drive including a speed limit that is below a maximum speed of the indoor unit rotary component;
    an outdoor unit comprising a second variable speed drive to control a speed of an outdoor unit rotary component, the second variable speed drive including a speed limit that is below a maximum speed of the outdoor unit rotary component;
    a system controller in communication with the indoor unit and the outdoor unit and configured to transmit a first control signal to the first variable speed drive and the second variable speed drive;
    wherein upon receiving the first control signal, the first variable speed drive and the second variable speed drive are configured to operate in a high speed mode which is above the speed limit of the respective rotary component thereof.

2. The HVAC system in accordance with claim 1, further comprising a temperature sensor in communication with the system controller and configured to sense an ambient temperature in a conditioned space.

3. The HVAC system in accordance with claim 1, wherein the system controller is further configured to transmit a second control signal to the first variable speed drive and the second variable speed drive, wherein upon receiving the second control signal, the first variable speed drive and the second variable speed drive are configured to operate in a low speed mode.

4. The HVAC system in accordance with claim 1, wherein the indoor unit rotary component comprises an indoor blower motor.

5. The HVAC system in accordance with claim 1, wherein the outdoor unit rotary component is selected from the group consisting of an outdoor fan motor and a compressor motor.

6. The HVAC system in accordance with claim 1, wherein the high speed mode is enabled for a predetermined time duration to effectuate an enhanced cooling mode after which the HVAC system reverts to a normal speed mode.

7. The HVAC system in accordance with claim 6, wherein when the predefined time duration for enhanced cooling mode in the room is completed, a subsequent enhanced cooling mode is restricted from restarting until the expiration of a pre-set delay time.

8. The HVAC system in accordance with claim 6, wherein the enhanced cooling mode is canceled and/or disabled in response to a demand curtailment request received from a utility.

9. The HVAC system in accordance with claim 6, further comprising providing a predefined daily time budget for the enhanced cooling mode.

10. The HVAC system in accordance with claim 9, wherein an unused portion of the daily time budget is carried forward over to the following day.

11. The HVAC system in accordance with claim 9, wherein during the low speed mode, the HVAC system is configured to run at a lower speed than that which is required to maintain a minimum set point temperature.

12. The HVAC system in accordance with claim 1, further comprising a user interface in communication with the system controller and configured for a user to communicate with the indoor unit and the outdoor unit via the system controller, wherein the user can initiate the high speed mode and/or the low speed mode of the HVAC components.

13. The HVAC system in accordance with claim 12, wherein the user interface is configured to facilitate entry of a maximum allowable deviation from a set point temperature.

14. The HVAC system in accordance with claim 1, wherein the outdoor unit further comprises a low speed mode user interface to enable a user to access the low speed mode at the outdoor unit.

15. The HVAC system in accordance with claim 14, wherein the low speed mode user interface is configured to restrict access to the low speed mode to an authorized user.

16. A method to control speed of heating, ventilation, and air conditioning (HVAC) rotary components, comprising;
providing a HVAC system comprising:
an indoor unit comprising a first variable speed drive to control a speed on an indoor unit rotary component, the first variable speed drive including a speed limit that is below a maximum speed of the indoor unit rotary component;
an outdoor unit comprising a second variable speed drive to control a speed of an outdoor unit rotary component, the second variable speed drive including a speed limit that is below a maximum speed of the outdoor unit rotary component;
a system controller in communication with the indoor unit and the outdoor unit and configured to transmit a first control signal to the first variable speed drive and the second variable speed drive; and
transmitting the first control signal to the indoor unit rotary component and the outdoor unit outdoor unit rotary component to operate said rotary components at a high speed mode which is above the speed limit of said rotary components to effectuate an enhanced cooling mode.

17. The method in accordance with claim 16, wherein providing a HVAC system includes providing a temperature sensor configured to sense an ambient temperature in a conditioned space.

18. The method in accordance with claim 17, further comprising restricting a subsequent enhanced cooling mode to be restarted until the expiration of a pre-set delay time.

19. The method in accordance with claim 16, further comprising operating the rotary components at a low speed mode to reduce the noise generated from the rotary components.

20. The method in accordance with claim 19, further comprising operating the rotary components at a lower speed than that which is required to maintain a set point temperature.

21. The method in accordance with claim 16, wherein inducing the enhanced cooling mode includes enabling the high speed mode for a predefined time duration after which the HVAC system reverts back to a normal operation speed.

22. The method in accordance with claim 16, further comprising canceling and/or disabling the enhanced cooling mode in response to a demand curtailment request received from a utility.

* * * * *